(12) United States Patent
Modzel

(10) Patent No.: US 10,894,395 B2
(45) Date of Patent: Jan. 19, 2021

(54) METHODS FOR MAKING 3D PARTS USING COMPOSITE BASED ADDITIVE MANUFACTURING WITH PERFORATED SHEETS AND PARTS FORMED THEREFROM

(71) Applicant: Ford Motor Company, Dearborn, MI (US)

(72) Inventor: John Modzel, Farmington Hills, MI (US)

(73) Assignee: Ford Motor Company, Dearborn, MI (US)

(*) Notice: Subject to any disclaimer, the term of this patent is extended or adjusted under 35 U.S.C. 154(b) by 18 days.

(21) Appl. No.: 16/053,031

(22) Filed: Aug. 2, 2018

(65) Prior Publication Data

US 2020/0039204 A1 Feb. 6, 2020

(51) Int. Cl.
| | |
|---|---|
| B29C 65/00 | (2006.01) |
| B32B 37/12 | (2006.01) |
| B32B 38/04 | (2006.01) |
| B32B 38/00 | (2006.01) |
| B29C 65/48 | (2006.01) |

(52) U.S. Cl.
CPC ...... *B32B 37/1292* (2013.01); *B32B 38/0012* (2013.01); *B32B 38/04* (2013.01); *B29C 65/00* (2013.01); *B29C 65/4815* (2013.01); *B29C 66/02* (2013.01); *B29C 66/02242* (2013.01); *B29C 66/0326* (2013.01); *B32B 2038/047* (2013.01); *B32B 2262/101* (2013.01); *B32B 2262/106* (2013.01)

(58) Field of Classification Search
CPC . B32B 37/1292; B32B 38/04; B32B 38/0012; B29C 65/00; B29C 65/4815; B29C 66/02; B29C 66/02242; B29C 66/036
See application file for complete search history.

(56) References Cited

U.S. PATENT DOCUMENTS

| | | |
|---|---|---|
| 9,796,140 B2 | 10/2017 | Page |
| 2016/0082658 A1 | 3/2016 | Swartz et al. |
| 2016/0325383 A1 | 11/2016 | Xu et al. |
| 2017/0129179 A1 | 5/2017 | Mandel et al. |
| 2017/0274595 A1 | 9/2017 | Swartz et al. |

FOREIGN PATENT DOCUMENTS

| | | |
|---|---|---|
| CN | 103394807 | 11/2013 |
| CN | 105922586 | 9/2016 |

*Primary Examiner* — Mark A Osele
*Assistant Examiner* — Nickolas R Harm
(74) *Attorney, Agent, or Firm* — Burris Law, PLLC

(57) ABSTRACT

A method of forming a 3D part includes applying liquid on a pattern on at least some of a plurality of sheets, applying a bonding agent on the liquid pattern on the at least some of the plurality of sheets, and forming perforations within the plurality of sheets along a perforation outline. The plurality of sheets are bonded together at the patterns between sheets via the bonding agent and a 3D pre-form within a stack of the plurality of sheets is formed. The perforations within each sheet bounds the pattern on each sheet and excess sheet material is removed from the stack of sheets bonded together by separating the plurality sheets along the perforations. Removal of the excess sheet material provides a semi-finished 3D part. The semi-finished 3D part may be further processed, e.g., by bead blasting, to provide a finished 3D part.

18 Claims, 4 Drawing Sheets

METHODS FOR MAKING 3D PARTS USING COMPOSITE BASED ADDITIVE MANUFACTURING WITH PERFORATED SHEETS AND PARTS FORMED THEREFROM

The present disclosure relates to the field of 3D printing, and more specifically, to 3D printing using composite based additive manufacturing (CBAM).

BACKGROUND

The statements in this section merely provide background information related to the present disclosure and may not constitute prior art.

Composite Based Additive Manufacturing (CBAM) may be used to produce 3D printed parts by fusing thin sheets of material together to form a fused layered block. The thin sheets may be fused together at predefined areas or patterns between adjacent sheets where a heat activated bonding agent has been applied. Also, the thin sheets with the predefined patterns of heat activated bonding agent may be stacked on top of each other and heat and pressure applied to the stack of thin sheets to assist with or result in the bonding process. The bonded predefined areas extending through the stack of thin sheets define or form a fused 3D body or shape. However, excess material not included in the fused 3D body or shape must typically be removed such that a final or finished 3D part is provided.

The excess material that is not part of the fused 3D body or shape may be removed by bead blasting. That is, portions of the thin sheets not bonded to each other generally comprise loose fibers that can be removed from the fused 3D body or shape by bead blasting. However, there is a need to reduce the time required to remove the excess material and avoid undesired bead blasting of the fused 3D body or shape while removing the excess material.

The present disclosure addresses the issues of removing excess material associated with 3D printed parts formed with CBAM, among other issues in the manufacture of 3D printed parts formed using CBAM.

SUMMARY

In one form of the present disclosure, a method of forming a 3D part includes applying liquid in a pattern on at least some of a plurality of sheets, applying a bonding agent on the pattern, and forming perforations along a perforation outline in each of a plurality of sheets. The plurality of sheets are bonded together via the bonding agent and excess sheet material is removed from the plurality of sheets bonded together by separating the plurality sheets along the perforations. The perforations may be formed in the plurality of sheets using a laser and/or a knife. In some aspects of the present disclosure, the liquid is applied in the pattern on at least some of the plurality of sheets using a liquid printer and the bonding agent is applied to the pattern using a bonding agent printer. The bonding agent may be a heat activated bonding agent, e.g., in the form of a powder, and excess bonding agent not on the pattern may be removed before the plurality of sheets are bonded together. The method may further include stacking and clamping the plurality of sheets together and heating the plurality of sheets stacked and clamped together such that the heat activated bonding agent melts and adjacent sheets are bonded together at the pattern. The plurality of sheets bonded together at the pattern form a 3D pre-form of the 3D part before the excess sheet material is removed. The heat activated bonding agent may be formed from nylon and/or polyether ether ketone, and the plurality of sheets may be carbon fiber sheets and/or fiberglass sheets. Removing excess sheet material from the 3D pre-form by separating the plurality sheets along the perforations forms a semi-finished 3D part and the semi-finished 3D part may be bead blasted to form a finished 3D part.

In another form of the present disclosure, a method of forming a 3D part includes applying liquid in a pattern on at least some of a plurality of sheets, applying a heat activated bonding agent on the pattern, removing any excess heat activated bonding agent not on the pattern, and perforating the plurality of sheets along a perforation outline. The plurality of sheets are aligned and stacked on top of each together, and may be clamped together, such that the patterns on the at least some of the plurality of sheets form a 3D shape within the stack of sheets. Heat may be applied to the plurality of sheets stacked and clamped together such that heat activated bonding agent melts and the plurality of sheets are bonded together at the patterns. A semi-finished 3D part is formed by removing excess sheet material from the plurality of sheets bonded together. The excess sheet material may be removed by separating each of the plurality of sheets along the perforation outline on each sheet. The semi-finished 3D part may be bead blasted to form a finished 3D part. The perforations in the plurality of sheets may be formed using a laser and/or a knife. Also, the plurality of sheets may be carbon fiber sheets and/or fiberglass sheets. The perforation outline on each of the plurality of sheets may bound the pattern on each of the plurality of sheets. Also, the perforation outline on each of the plurality of sheets may bound an inner portion and an outer portion of the pattern on each of the plurality of sheets.

In still another form of the present disclosure, a 3D pre-form of a 3D part includes a plurality of sheets aligned with and stacked on each other, and the plurality of sheets are bonded to each other along a pattern on each of the plurality of sheets. A plurality of perforations along a perforation outline on each of the plurality of sheets is included and the perforation outline bounds the pattern on each of the plurality of sheets. The plurality of sheets may include carbon fiber sheets and/or fiberglass sheets.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
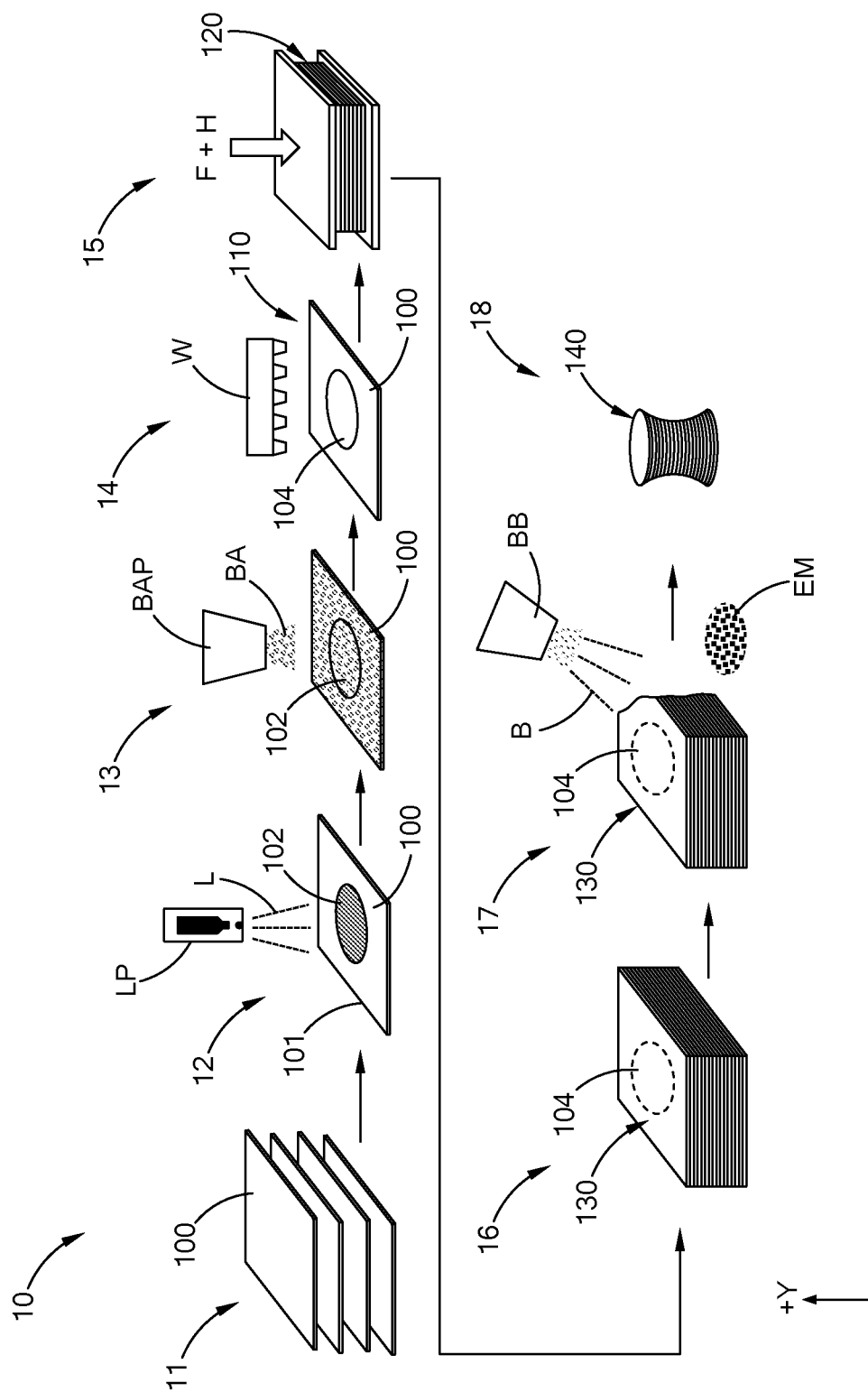
FIG. 1 is a schematic illustration of a process for forming a 3D part using Composite Based Additive Manufacturing (CBAM) according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a prior art method 10 of forming a 3D part 140 using Composite Based Additive Manufacturing (CBAM) is shown. The prior art process 10 generally includes the steps of providing a plurality of thin layers 100 of material (also referred to herein as "sheets" or simply "thin layers") at step 11 and spraying a liquid 'L' on or in a pattern 102 (referred to herein simply as "in a pattern" or "in the pattern") on an upper surface 101 (+Y direction) of each sheet 100 using a liquid printer 'LP' at step 12. A bonding agent 'BA', e.g., a heat activated bonding agent, may be applied to the pattern 102 with the liquid L thereon using a bonding agent printer 'BAP' at step 13. The bonding agent BA adheres or 'sticks' to the liquid L on the sheet 100. Accordingly, the bonding agent BA is attached to the sheet 100 along or over the pattern 102. The bonding agent BA may be applied to an area outside of the pattern, e.g., over the entire upper surface 101 of the sheet 100. Excess bonding agent BA not positioned on the pattern 102 may be removed with a vacuum 'V', wiper, brush, etc., at step 14 such that a bonding agent patterned sheet 110 comprising a 2D bonding agent pattern 104 is provided. A plurality of sheets 100 are processed through steps 12, 13 and 14 such that a plurality of bonding agent patterned sheets 110 with 2D bonding agent patterns 104 are provided. The plurality of bonding agent patterned sheets 110 are aligned and stacked onto each other to form a pre-CBAM stack 120 at step 15. Heat and pressure may be applied to the pre-CBAM stack 120 at step 15 to form a CBAM stack 130 as schematically depicted at step 16 in which the plurality of bonding agent patterned sheets 110 are fused together at the 2D bonding agent patterns 104 between adjacent BA patterned sheets 110. Accordingly, a 3D body or shape (not shown) within the CBAM stack 130 is formed. Excess material 'EM' is removed from the CBAM stack 130 at step 17 by bead blasting 'BB' the CBAM stack 130 such that a finished 3D part 140 is provided at step 18. Depending on the shape and size of the 3D body, removal of the excess material EM from the CBAM stack 130 may require significant time. Also, handling and bead blasting the CBAM stack may result in material undesirably being removed from portions of the finished 3D part 140, e.g., at locations such as edges, corners, etc., of the finished 3D part 140.

Figure 2:
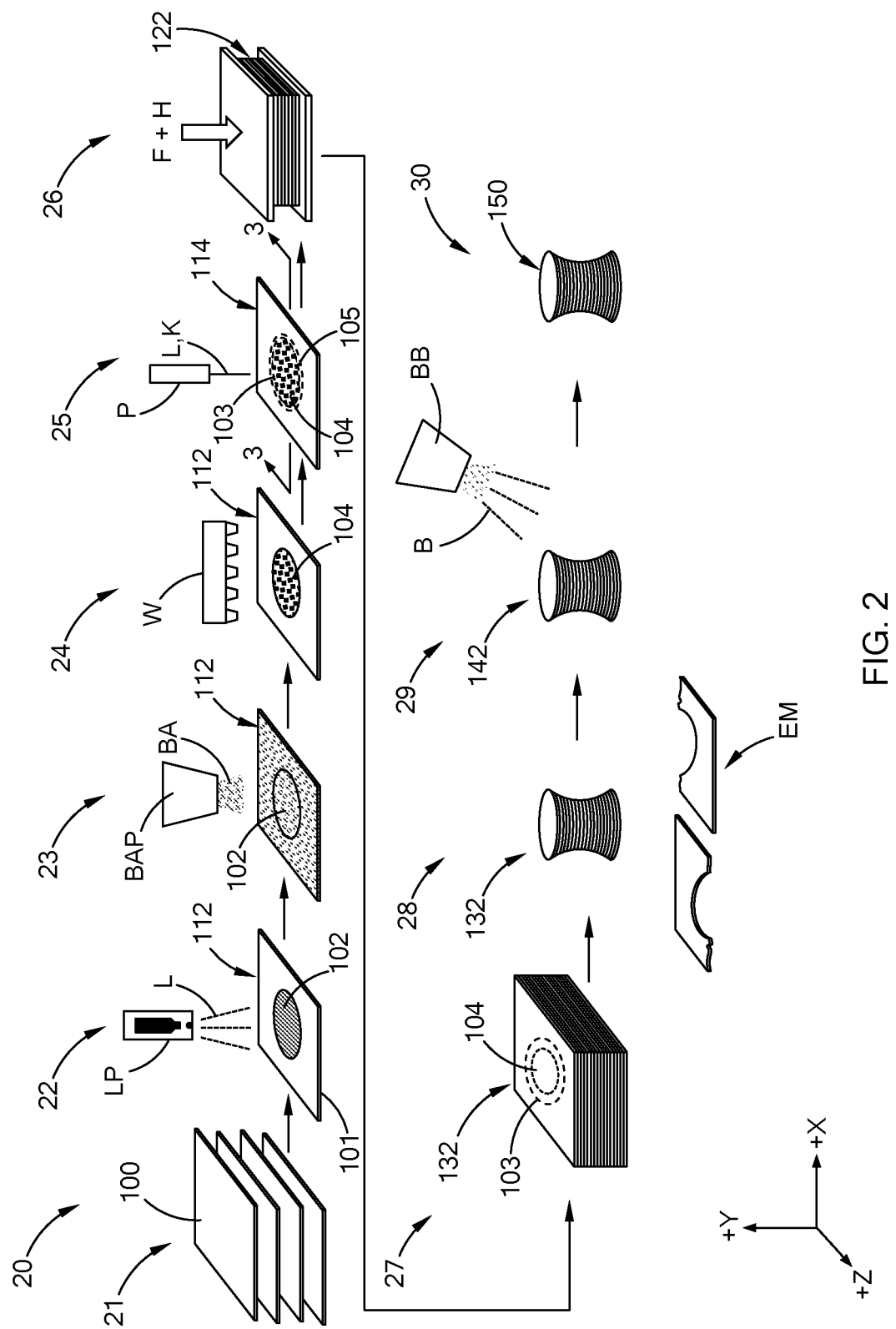
FIG. 2 is a schematic illustration of a process for forming a 3D part using Composite Based Additive Manufacturing (CBAM) according to the teachings of the present disclosure.

Referring now to FIG. 2, a method of forming a part according to the teachings of the present disclosure is illustrated and generally indicated by reference numeral 20. Generally, the method 20 comprises the steps of providing a plurality of sheets 100 at step 21 and applying a liquid L to an upper surface 101 of a sheet 100 in a pattern 102 to form a patterned sheet 112 at step 22. A bonding agent BA, e.g., a heat activated bonding agent, may be applied to the pattern 102 with the liquid L thereon at step 23. The bonding agent BA adheres or sticks to the liquid L on the sheet 100. Accordingly, the bonding agent BA is attached to the patterned sheet 112 along or over the pattern 102 such that a layer of the bonding agent BA is disposed on the patterned sheet 112. In one aspect of the present disclosure, the bonding agent BA may be applied to an area outside of the pattern, e.g., over the entire upper surface 101 of the sheet 100, and excess bonding agent BA not positioned on the pattern 102 is removed from the sheet 100 with a vacuum 'V', wiper or brush at step 24 to form a bonding agent pattern 104 on the patterned sheet 112.

Figure 3A:
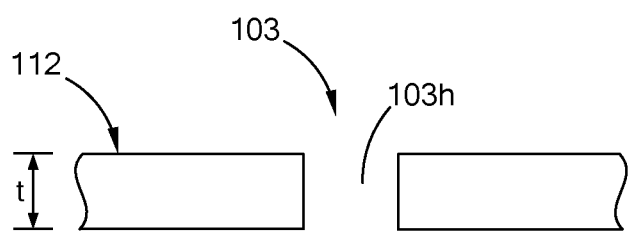
FIG. 3A is a cross-sectional view of a section 3-3 in FIG. 2 according to the teachings of the present disclosure.
Figure 3B:
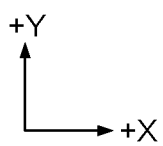
FIG. 3B is a cross-sectional view of a section 3-3 in FIG. 2 according to the teachings of the present disclosure.
Figure 3B:
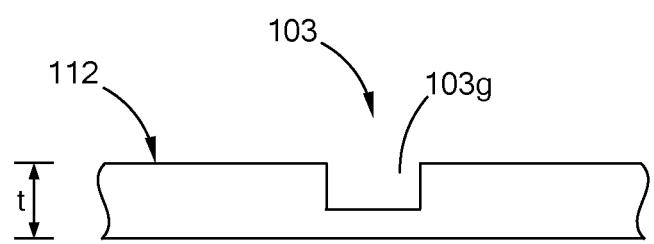

The patterned sheet 112 with the bonding agent BA adhered thereto is perforated at step 25 to form a perforated BA patterned sheet 114. For example, a plurality of perforations 103 may be formed in the patterned sheet 112 at step 25 using a perforation machine 'P.' The perforation machine P may include a laser 'L' and/or a knife 'K' that forms the plurality of perforations 103 in the sheet 100 along a perforation outline 105 that may bound the bonding agent pattern 104. As used herein, the term "perforated" and "perforating" refers to at least one indentation in a sheet and a process of forming at least one indentation in a sheet, respectively, and the term "bound" refers to perforations and/or a perforation outline spaced apart from and extending adjacent to at least a portion of a pattern on a sheet. In some aspects of the present disclosure, the indentation may be a hole or slit that extends through a thickness 't' (Y-direction as depicted in the figures) of the sheet 100 as schematically depicted in FIG. 3A. For example, the laser L and/or knife K may form a plurality of holes or slits 103$h$ along the perforation outline 105 (FIG. 2). In another aspect of the present disclosure, the indentation may be a channel or groove 103$g$ that extends into but not completely through the thickness t of the sheet 100 as schematically depicted in FIG. 3B. For example, the laser L and/or knife K may form a continuous or discontinuous channel or groove along the perforation outline 105 (FIG. 2).

A plurality of sheets 100 are processed through steps 22, 23, 24 and 25 such that a plurality of perforated BA patterned sheets 114 with bonding agent patterns 104 are provided. The plurality of perforated BA patterned sheets 114 are aligned and stacked onto each other to form a pre-CBAM stack 122 at step 26. Heat and pressure may be applied to the pre-CBAM stack 122 at step 26 to form a CBAM stack 132 as schematically depicted at step 27. It should be understood that the plurality of perforated BA patterned sheets 114 are fused together at adjacent 2D bonding agent patterns 104 thereby forming a 3D pre-form (not shown) within the CBAM stack 132. As used herein, the term "3D pre-form" refers to a 3D shape within a stack of aligned sheets, the 3D shape being formed by the bonding together of the stack of aligned sheets at patterns on and between adjacent sheets. Excess material 'EM' is removed from the CBAM stack 132 at step 28 by separating (e.g., tearing, cutting, etc.) the plurality of perforated BA patterned sheets 114 along the perforations 103 such that sheet material that is not part of the 3D pre-form is removed from the CBAM stack 132 and a semi-finished 3D part 142 is provided. The semi-finished 3D part 142 is finished at step 29, e.g., by bead blasting 'BB', to provide a finished 3D part 150 at step 30. It should be understood that removal of the excess material EM by separating the perforated BA patterned sheets 114 along the perforations 103 reduces the amount of handling and/or bead blasting required to provide the finished 3D part 150, thereby reducing the time and costs for producing the finished 3D part 150.

While FIG. 2 schematically depicts perforating the sheet 100 at step 25 to form a perforated BA patterned sheet 114 after step 24 (i.e., after the liquid L is applied to the sheet 100 at step 22, bonding agent BA is applied to the pattern 102 at step 23, and any excess bonding agent BA is removed at step 24), it should be understood the sheet 100 may be perforated before the liquid L is applied at step 22, after the bonding agent BA is applied to the sheet 100 at step 23, and/or after excess bonding agent BA is removed from the sheet 100 at step 24. Accordingly, the sheet 100 may be perforated before step 22, between steps 22 and 23, between steps 23 and 24, and/or between steps 24 and 25 schematically depicted in FIG. 2.

It should also be understood that in some aspects of the present disclosure, liquid L and bonding agent BA are applied to each of the plurality of sheets 100 forming a pre-CBAM stack 122 at step 26, while in other aspects of the present disclosure liquid L and bonding agent BA are not applied to each of the plurality of sheets 100 forming a pre-CBAM stack 122. That is, the liquid L and bonding agent BA may be applied to a subset of the plurality of sheets 100 (e.g., every other sheet 100, every third sheet 100, etc.) forming a pre-CBAM stack 122 schematically depicted in FIG. 2. In such aspects of the present disclosure, the bonding agent BA melts and flows through the sheets 100 having the bonding agent BA applied thereto and the sheets 100 not having the bonding agent BA applied thereto such that a CBAM stack 132 is formed.

The plurality of sheets 100 may be formed from any suitable material for making a 3D part, illustratively including but not limited to carbon fiber, fiberglass, Kevlar, cotton, mineral wool, materials not yet known and/or developed, and the like. The plurality of sheets may be formed from unidirectional fibers, woven fibers, continuous fibers extending across the length and/or width of the sheet, discontinuous fibers, and the like. The plurality of sheets 100 may each have thickness 't' (FIG. 3A) between about 100 micrometers (μm) and about 1000 μm. For example, plurality of sheets 100 may each have thickness between about 100 μm and about 200 μm, between about 200 μm and about 300 μm, between about 300 μm and about 400 μm, between about 400 μm and about 500 μm, between about 500 μm and about 600 μm, between about 600 μm and about 700 μm, between about 700 μm and about 800 μm, between about 800 μm and about 900 μm, or between about 900 μm and about 1000 μm.

The liquid L may be any liquid that adheres or wets the sheet 100 and a bonding agent applied to the liquid L on a sheet 100 adheres to the liquid and thereby adheres to the sheet 100. Non-limiting examples of the liquid L include water and aqueous solutions comprising water with additions to retard or delay evaporation of the water after being applied to the pattern 102. The bonding agent BA may be any suitable bonding agent that adheres to the liquid L on a sheet 100 and thereby adheres to the sheet 100. Non-limiting examples of the bonding agent BA include thermoset resins such as epoxy, thermoplastic polymers such as polyesters, vinyl esters, nylon or polyether ether ketone (PEEK), polymers not yet known and/or developed, and the like. In some aspects of the present disclosure, the bonding agent BA is a powder that is applied to the pattern 102 using a binding agent printer 'BAP'. In other aspects of the present disclosure, the bonding agent BA is not a powder, but may be in the form of elongated rods, fibers, strips, etc., that is applied to the pattern 102, or a sheet in the form of the pattern 102 that is placed on the pattern 102. In still other aspects of the present disclosure, the bonding agent BA may be a mixture a powder and a non-powder such as elongated rods, fibers, strips, sheet, etc.

Heat applied to the pre-CBAM stack 120 may be sufficient to melt the bonding agent BA on the plurality of perforated BA patterned sheets 114 such that adjacent perforated BA patterned sheets 114 are bonded to each other. For example, for a bonding agent BA formed from nylon with a melting point of about 220° C., heat may be applied to the pre-CBAM stack 122 such that the temperature of the nylon is equal to or greater than 220° C. and the nylon melts. In the alternative, for a bonding agent BA formed from PEEK with a melting point of about 345° C., heat may be applied to the pre-CBAM stack 122 such that the temperature of the PEEK is equal to or greater than 345° C. and the PEEK melts. It should be understood that upon melting, the bonding agent BA flows into the perforated sheet 112 where it has been applied and into an adjacent perforated sheet 112. Upon solidification, the bonding agent BA is continuous throughout the plurality of perforated BA patterned sheets 114 and thereby bonds the sheets 114 together at locations where the bonding agent BA is present, i.e., at the patterns 102 extending through the plurality perforated BA patterned sheets 114.

Figure 4:
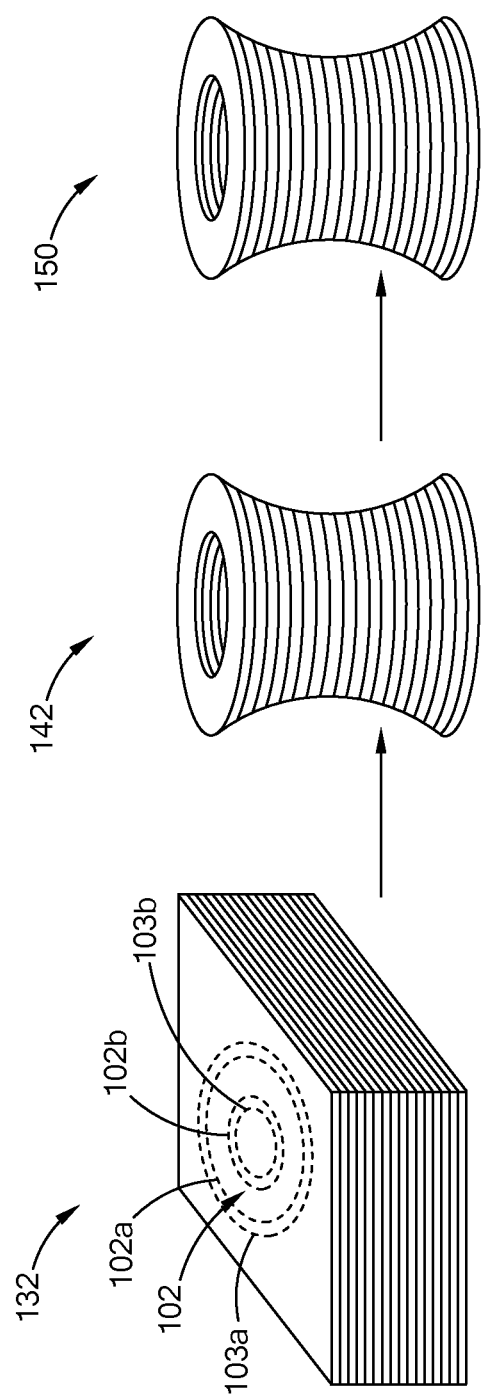
FIG. 4 is a perspective view of a 3D part formed from CBAM in accordance with the teachings of the present disclosure.

While FIG. 2 schematically depicts the finished 3D part 150 as a solid part, i.e., without any holes or passageways, it should be understood that methods disclosed herein may be used to form 3D parts with holes, passageways, etc. For example, and with reference to FIG. 4, a CBAM stack 132 is schematically depicted with a first perforation outline 103a (e.g., an outer perforation outline), a pattern 102 with a first boundary line 102a (e.g., an outer boundary line) and a second boundary line 102b (e.g., an inner boundary line), and an inner perforation outline 103b (e.g., an inner perforation outline). Accordingly, the first perforation outline 103a bounds or borders the first boundary line 102a of the pattern 102 and the second perforation outline 103b bounds or borders the second boundary line 102b of the pattern 102. Excess material EM (not shown) is removed the CBAM stack 132, e.g., at step 28 (FIG. 2) by separating the plurality of perforated BA patterned sheets 114 along the first perforation outline 103a and the second perforation outline 103b such that a semi-finished 3D part is part 142 is provided. The semi-finished 3D part 142 is finished, e.g., at step 29 (FIG. 2) by bead blasting, to provide a finished 3D part 150.

The 3D parts formed according to the teachings of the present disclosure may exhibit high strength and/or toughness in directions parallel to the plane of sheets used to form the 3D parts and high strength and/or toughness in the direction perpendicular to the sheets used to form the 3D parts. For example, the finished 3D parts 150 depicted in the figures may exhibit high tensile strength in the X-Z plane depicted in the figures and a high compression strength in the Y-direction depicted in the figures.

It should be understood from the present disclosure that a method for reducing the time, costs and/or labor required to produce a finished 3D part formed by CBAM is provided. The method includes perforating a plurality of sheets along a perforation outline that bounds a 2D bonding agent pattern on each of the plurality of sheets such that after the plurality of sheets have been bonded together to form a 3D pre-form, excess material can be easily removed and separated from the 3D pre-form by simply separating the sheet material along the perforation outline. Removal of the excess material may significantly decrease the amount of excess material to be removed such that a finished 3D part is provided. That is, rather than removing and separating most, if not all, of the excess material from the 3D pre-form via machining, bead blasting, etc., in order to form a finished 3D part, at least some, if not most, of the excess material is removed and separated from the 3D pre-form by simply separating excess sheet material along perforations within the plurality of sheets.

As used herein, the phrase "semi-finished" refers to a part that requires the removal of material in order to form a finished part and the phrase "finished" refers to a part that has desired excess material removed and is ready for further processing (e.g., painting) or use. The use of the term "about" when used with values disclosed herein refers to error or uncertainty associated with measurements to obtain such values using known techniques, equipment, etc. The terms "upper", "outer" and "inner" as used herein refer to the position or location of a surface, line, boundary line, etc., in the drawings and do not refer to an exact or specific orientation or location of a surface, line, boundary line, etc., for a method or part formed by a method according to the teachings of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of forming a 3D part comprising:
    applying liquid in a pattern on at least a subset of a plurality of sheets;
    applying a bonding agent on the pattern;
    forming perforations along a perforation outline in each of the plurality of sheets;
    bonding the plurality of sheets together via the bonding agent; and
    removing excess sheet material by separating the plurality of sheets along the perforations.

2. The method of claim 1, wherein the perforations are formed in the plurality of sheets using at least one of a laser and a knife.

3. The method of claim 1, wherein the liquid is applied to each of the plurality of sheets.

4. The method of claim 1, wherein the liquid is applied to the pattern using a liquid printer.

5. The method of claim 1, wherein the bonding agent is applied using a bonding agent printer.

6. The method of claim 5, wherein applying the bonding agent on the pattern comprises applying excess bonding agent not on the pattern and further comprising removing the excess bonding agent not on the pattern.

7. The method of claim 1, wherein the bonding agent is a heat activated bonding agent in the form of a powder.

8. The method of claim 7, further comprising:
    stacking and clamping together the plurality of sheets with the heat activated bonding agent; and
    heating the plurality of sheets stacked and clamped together such that the heat activated bonding agent melts and the plurality of sheets are bonded together along the pattern on at least subset of the plurality of sheets.

9. The method of claim 8, wherein the plurality of sheets bonded together form a 3D pre-form of the 3D part before the excess sheet material is removed.

10. The method of claim 8, wherein the heat activated bonding agent comprises at least one of nylon and polyether ether ketone (PEEK).

11. The method of claim 1, wherein the plurality of sheets comprise at least one of a plurality of carbon fiber sheets and a plurality of fiberglass sheets.

12. The method of claim 1 further comprising bead blasting the plurality of sheets bonded together after the excess sheet material has been removed.

13. A method of forming a 3D part comprising:
    applying liquid on a pattern on each of a plurality of sheets;
    applying a heat activated bonding agent on the liquid applied to each of the plurality of sheets and excess heat activated bonding agent not on the liquid applied to each of the plurality of sheets;
    removing the excess heat activated bonding agent not on the liquid applied to each of the plurality of sheets;
    perforating a plurality of sheets along a perforation outline on each of the plurality of sheets;
    stacking and clamping the plurality of sheets together such that the patterns on each of the plurality of sheets are in alignment with each other throughout the stack of the plurality of sheets;
    heating and cooling the plurality of sheets stacked and clamped together such that the plurality of sheets are bonded together at the patterns between adjacent sheets via the heat activated bonding agent; and
    forming a semi-finished 3D part by removing excess sheet material from the plurality of sheets bonded together by separating each of the plurality of sheets along the perforation outline.

14. The method of claim 13 further comprising bead blasting the semi-finished 3D part.

15. The method of claim 13, wherein the perforations are formed in the plurality of sheets using at least one of a laser and a knife.

16. The method of claim 13, wherein the plurality of sheets comprise at least one of a plurality of carbon fiber sheets and a plurality of fiberglass sheets.

17. The method of claim 13, wherein the perforation outline on each of the plurality of sheets bounds the pattern on each of the plurality of sheets.

18. The method of claim 13, wherein the perforation outline on each of the plurality of sheets bounds an inner portion and an outer portion of the pattern on each of the plurality of sheets.

* * * * *